Figure 2:
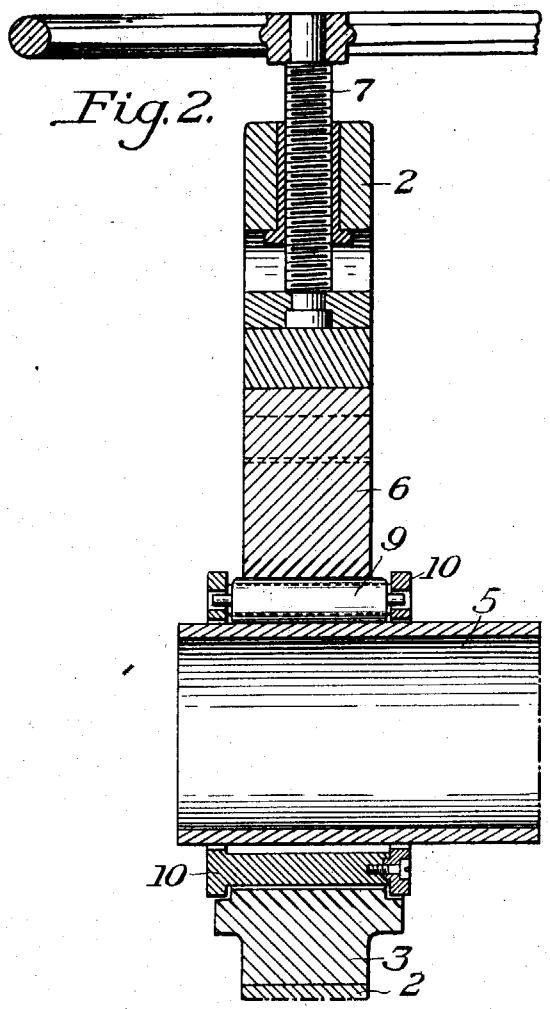

Dec. 1, 1925 Re. 16,220

G. E. MIRFIELD

METHOD AND APPARATUS FOR ROUNDING ARTICLES

Original Filed July 11, 1922

INVENTOR
George E. Mirfield
by his attorneys
Byrnes, Stebbins + Parmelee

Reissued Dec. 1, 1925.

Re. 16,220

UNITED STATES PATENT OFFICE.

GEORGE E. MIRFIELD, OF YOUNGSTOWN, OHIO.

METHOD AND APPARATUS FOR ROUNDING ARTICLES.

Original No. 1,548,731, dated August 4, 1925, Serial No. 574,185, filed July 11, 1922. Application for reissue filed October 29, 1925. Serial No. 65,690.

*To all whom it may concern:*

Be it known that I, GEORGE E. MIRFIELD, a citizen of the United States, and residing at Youngstown, in the county of Mahoning and State of Ohio, have invented a new and useful Improvement in Methods and Apparatus for Rounding Articles, of which the following is a full, clear, and exact description.

The present invention relates broadly to metal bending, and more particularly to a method and apparatus for rounding circular objects such as rods, bars, pipes and the like.

In connection with the manufacture of pipe, it is quite customary at the present time to round the ends thereof prior to the threading operation. This has been found essential as the pipes are usually not truly circular and it is therefore difficult to produce an accurate thread thereon.

In accordance with one method which is commonly used for rounding pipes and other objects, there is provided a lower supporting member usually termed a rounding block, having a supporting surface conforming to the curvature of the object to be rounded and adapted to extend around a substantial portion of the circumference thereof. Cooperating therewith there is provided a second rounding block having a curved supporting surface having a greater radius than the radius of the object being operated upon, whereby this supporting surface extends eccentric to the surface of such object. The second rounding block is usually adjustable whereby it may be gradually moved toward the surface of the object to thereby increase its operating action thereon. During such movement of the second rounding block there is produced a relative rotational movement between the same and the object being rounded. This is usually, though not necessarily, accomplished by rotating the object with respect to the rounding blocks.

It has been found that with this method the friction of the rounding surfaces against the pipe or other object is so great that it is practically impossible to provide rounding blocks having a sufficient area to cooperate at one time with the entire portion of the surface of the object which it is desired to round. Such rounding blocks, due to this friction, are rapidly worn away and it therefore becomes necessary to frequently renew the same. Another objection to an apparatus of the character described arises from the tendency of the rounding blocks to force or grind the scale into the surface of the object being rounded and thereby interfere with the action of the threading die and tending to quickly dull the same.

By the present invention the objections to an apparatus of this character are entirely obviated and there is provided means for quickly and accurately rounding the entire portion of the surface of an object as found necessary.

In the accompanying drawings there is shown, for purposes of illustration only, one embodiment of the present invention, it being understood that the drawings do not define the limits of my invention and that changes may be made in the construction and operation disclosed therein without departing from the spirit of the invention or the scope of my broader claims.

Figure 1:
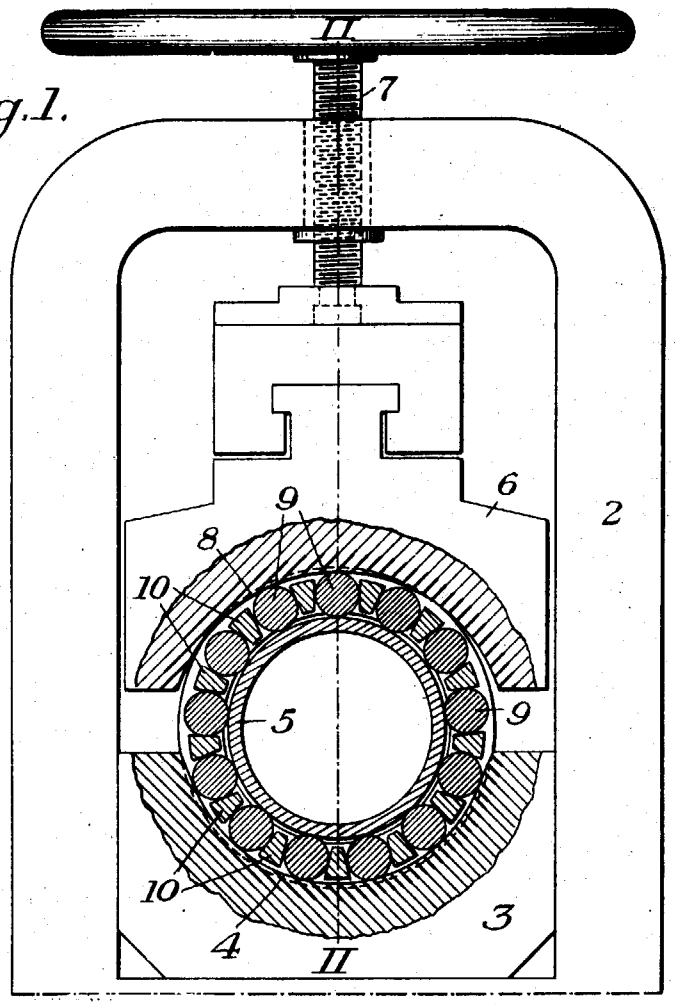

In the drawings:

Figure 1 is an end elevation partly broken away and partly in section, illustrating one form of apparatus for carrying out the present invention; and Figure 2 is a vertical sectional view on the line II—II of Figure 1.

In the illustrated embodiment of the invention there is shown a housing 2 having supported therein a rounding block 3 provided with a curved surface 4 substantially conforming to the theoretically true curvature of the object 5 to be rounded. Vertically movable within the housing 2 is a second rounding block 6 having an operating connection of any desired construction with a screw-down 7, whereby the second rounding block may be moved toward and away from the surface of the object to be rounded. The rounding block 6 has a curved surface 8 which extends eccentric to the surface of the object 5 as illustrated. The curved surfaces 4 and 8 of the rounding blocks may each be hardened in any desired manner in accordance with well known practice to increase the life thereof.

For decreasing the friction which normally exists between the rounding blocks and the object being rounded, I entirely obviate the scraping or rubbing friction which usually occurs and provide a supporting surface comprising a plurality of rolling contacts. This may be accomplished by utilizing a series of rollers 9 rotatably carried in a suitable cage 10 similar in many respects to a roller bearing. This cage with its rollers 9 is mounted between the rounding blocks, and the end of the object 5 to be rounded is then slipped therethrough. A relative rotational movement between the object and the rounding blocks is then produced whereby the rollers 9 tend to travel along the supporting surfaces in the rounding blocks and thereby successively and individually engage different portions of the surface to be rounded.

In operation, it will be apparent that by reason of the curvature of the supporting surface 4, the rollers 9 uniformly act upon a substantial portion of the surface of the object 5. Due, however, to the formation of the surface 8, the action of the individual rollers is successively increased as the same travel toward the center line of the rounding block where the surface 8 of the block 6 lies nearest to the surface of the object being rounded. As the rollers 9 are in spaced relationship, it will be obvious that at certain times there is no roller in position to exert its maximum flexing action or rounding action on the object 5. At this time the screw-down 7 may be comparatively easily operated to move the block 6 nearer the object whereby when the next roller comes into position coinciding with the center line of this block, it will exert a still further action on the object. This constitutes a practical advantage over the apparatus as heretofore utilized, wherein it has been necessary to provide an operating handle of considerable length for turning down the upper rounding block against the object being rounded due to the enormous friction developed.

As the strength of a metal article is increased by the mechanical work done thereon, it will be apparent that the rollers 9 produce a harder and denser surface on the object. They are also effective for loosening the scale therefrom and permitting it to drop away whereby it does not subsequently interfere with the threading operation. This enables a smooth thread to be formed with less wear on the die or cutter.

The present construction is such as to adapt the same for use with pipe cutting, rounding or threading machines of standard construction, and is equally adaptable for operation upon circular rods or bars.

The advantages of the present invention arise from the provision of a plurality of rolling contacts for engaging and supporting the object being rounded, and from the method whereby different operations may be performed with a minimum of friction on different portions of the surface of the object being rounded.

I claim:

1. In the method of rounding circular objects, the steps consisting of supporting an object at a plurality of spaced points, producing relative movement between the object and the points of support, moving the points about the axis of the object, and progressively varying the operating pressure of successive points of support, substantially as described.

2. In the method of rounding circular objects, the steps consisting in providing a plurality of rolling supports for the object, producing relative movement between the object and said supports, moving the supports about the axis of the object, and progressively varying the operating pressure of successive points of support, substantially as described.

3. In the method of rounding circular objects, the steps consisting in supporting the object at a plurality of spaced points, producing relative movement between the object and the points of support, and moving the supports about the axis of the object and varying the effect of the points of support in opposite directions during such relative movement, substantially as described.

4. In the method of rounding circular objects, the steps consisting in producing relative rotational movement between the object and rounding means traveling about the circular object, uniformly acting upon the object throughout a substantial portion of its circumference during such movement and variably acting upon another portion of the circumference during such movement, substantially as described.

5. In the method of rounding circular objects, the steps consisting in providing rounding means, producing relative rotational movement between the object and the rounding means, and at the same time causing the rounding means to travel about the object, uniformly acting upon the object throughout a substantial portion of its circumference during such movement, and variably and successively acting upon other portions of the circumference thereof during such movement, substantially as described.

6. In the method of rounding circular objects, the steps consisting in entirely supporting the object by a plurality of rolling contacts traveling about the object and its support, and successively varying the effect of said contacts on the surface of the article, substantially as described.

7. In the method of rounding circular objects, the steps consisting in entirely supporting the object by a plurality of rolling contacts traveling about the object and its support, and successively and individually varying the effect of said contacts on the surface of the article, substantially as described.

8. In the method of rounding circular objects, the steps of producing relative rotary movement between a concave rounding die and an object to be rounded, and causing rollers to roll about such object and over the concave surface of the rounding die in a path eccentric to the axis of rotation of the object, substantially as described.

9. In the method of rounding circular objects, the steps consisting in engaging the object at a plurality of points by rolling contacts, causing a relative rotary movement of the object and the axes of the contacts, backing up at least some of the contacts, and successively varying the path of travel of the contacts in opposite directions during the process of rounding, substantially as described.

10. In the method of rounding circular objects, the steps consisting in engaging the periphery of the object at a plurality of points by rolling contacts, causing a relative rotary movement of the object and the axes of the contacts, backing up at least some of the contacts diametrically opposite their points of engagement with the object, and successively varying the path of travel of the contacts in opposite directions during the process of rounding, substantially as described.

11. In the method of rounding circular objects, the steps consisting in engaging the periphery of the object at a plurality of substantially equally spaced points by rolling contacts, causing a relative rotary movement between the object and the axes of the contacts, and backing up the contacts during such relative rotary movement, by a surface not concentric to the surface being rounded, substantially as described.

12. In the method of rounding circular objects, the steps consisting in providing rolling contacts for the object to be rounded and successively moving said contacts over supporting surfaces extending respectively substantially concentric to the surface of the object, and eccentrically with respect thereto, substantially as described.

13. In an apparatus for rounding circular objects, a supporting member having a supporting surface extending substantially concentric to the surface of the object to be rounded, a second supporting member having a surface extending eccentric with respect to the surface of said object, and a plurality of rolling contacts movable over said supporting surfaces, substantially as described.

14. In an apparatus for rounding circular objects, a supporting member having a supporting surface extending substantially concentric to the surface of the object to be rounded, a second supporting member having a surface extending eccentric with respect to the surface of said object, a plurality of rolling contacts movable over said supporting surfaces, and means for adjusting the position of one of said supporting members, substantially as described.

15. In an apparatus for rounding circular objects, a plurality of rolling contacts for the surface of the article to be rounded, and means providing a track for said contacts having successive portions extending substantially concentric to the surface of said object, and then eccentric with respect thereto, substantially as described.

16. In an apparatus for rounding circular objects, a supporting member having a surface extending substantially concentric to the surface of the object being rounded, a second supporting member having a supporting surface extending eccentric relatively thereto, and means movable relatively to said surfaces for exerting a rounding action on said object, substantially as described.

17. In an apparatus for rounding circular objects, a supporting member having a surface extending substantially concentric to the surface of the object being rounded, a second supporting member having a supporting surface extending eccentric relatively thereto, means movable relatively to said surfaces for exerting a rounding action on said object, and means for producing a movement of one of said surfaces with respect to said object, substantially as described.

18. In an apparatus for rounding cylindrical objects, a supporting member having a curved roller-engaging surface eccentric to the center with which it cooperates, rollers adapted to be supported by and roll on the arcuate surface of said member and arranged to roll about the object to be rounded, and means for adjusting the supporting member to vary the path of travel of the rollers, substantially as described.

19. In an apparatus for rounding cylindrical objects, a support formed of a plurality of members, each having a concave roller-bearing surface, rollers for engaging the surface of the object to be rounded adapted to roll on the concave surfaces of said members, and means for producing relative movement between the members of the support to vary the path of travel of the rollers, substantially as described.

20. In an apparatus for rounding cylindrical objects, a support formed of a plurality of members, each having a concave roller-bearing surface, the surface on one member being concentric to the surface to be rounded when finished, while the surface on another member is eccentric to the said rounded surface, rollers for engaging the surface of the object to be rounded adapted to roll on said bearing surfaces, and means for producing relative movement between the members of the support to vary the path of the rollers, substantially as described.

21. In the method of rounding circular objects, the steps consisting of supporting an object at a plurality of spaced points, effecting relative movement circumferentially of the article to be rounded between said supporting points and the article, and alternately varying the effective radial pressure on the supporting points during such relative movement, substantially as described.

In testimony whereof I have hereunto set my hand.

GEORGE E. MIRFIELD.